3,681,187
CARBON FIBRES EMBEDDED IN GLASS MATRIX
Dennis Herbert Bowen, North Stoke, Oxon, Ronald Alfred James Sambell, Reading, Keith Albert Dale Lambe, Wantage, and Neville John Mattingley, Abingdon, England, assignors to United Kingdom Atomic Energy Authority, London, England
No Drawing. Filed May 1, 1969, Ser. No. 821,130
Claims priority, application Great Britain, May 16, 1968, 23,461/68; Oct. 2, 1968, 46,876/68
Int. Cl. F06b 9/26; C03c 13/00
U.S. Cl. 161—170                           8 Claims

ABSTRACT OF THE DISCLOSURE

A novel composite material comprises glass reinforced with carbon fibres. The glass may typically be a borosilicate glass or a nucleated glass. The novel materials is hard and strong, being resistant to mechanical and thermal shock.

BACKGROUND OF THE INVENTION

The present invention relates to composite materials, that is to say, the materials which comprise a matrix reinforced with a fibrous or fibre material. Such a composite material is an epoxide resin reinforced with glass fibre, and this material is now well known. This material has properties which are in general superior to either the martix or the reinforcing material and, for example, it has a higher tensile strength than the resin and is more resistant to mechanical shock than either component. Unfortunately, this material does not have adequate high temperature properties.

It is an object of the present invention to provide a new or improved composite material.

SUMMARY OF THE INVENTION

According to the present invention there is provided a composite material comprising glass reinforced with carbon fibres.

It will be well known that carbon fibres may be made by the controlled thermal degradation and oxidation of organic fibers, and particularly of synthetic polymeric fibres. We prefer to use the carbon fibres having a high tensile strength and high elastic modulus which are produced by the degradation of polyacrylonitrile fibres, for example by the process of U.K. patent application No. 17,128/64 (Ser. No. 1,110,791), corresponding to U.S. Pat. No. 3,412,062.

Various different glasses may be used as the matrix material in accordance with the present invention, and it will be appreciated that the resulting composites will have different properties depending upon the properties of the glass. For the avoidance of doubt, it may be convenient to define the term "glass" as used herein as meaning an inorganic oxide, or mixture of oxides, which during fabrication is raised to such a temperature that the mass is essentially molten and may then be cooled to solidify the mass without crystallisation of the major portion of the mass occurring. It is necessary to comment that it is within the scope of this invention to take a glass as above described, reduce it to particulate form, and then reform it into a solid mass a a temperature below he melting point. It should also be made clear that the majority of glasses do not have a sharp melting point but soften and then flow since they are naturally in the nature of supercooled liquids. It should also be made clear that, subsequent to the initial melting, heat treatment may be applied to the glass to cause it to nucleate or crystallise without taking it outside the definition of glass as used herein. Thus it should be emphasised that the use of the term "glass" does not necessarily imply that in the composite the matrix material is either transparent or a single phase material.

Articles of the composite material may be made by casting, pressing, moulding, rolling or extruding, and at some stage in the manufacture a relatively high temperature treatment will necessarily be involved. Thus, in essence, the glass may be infiltrated in a molten state between carbon fibres or a mass comprising powdered glass and carbon fibres may be either hot-pressed or cold-pressed and then heat treated to give the necessary composite.

It will therefore be understood that many varieties of glass may be used in accordance with this invention, the particular glass being chosen for its characteristics. Thus it may be desirable to choose a glass which has a relatively high fluidity, if the infiltration technique is used, or it may be desirable to choose a glass which has a low melting point if the hot-pressing technique is used. On the other hand, the physical properties of the glass are important in the final product and it may therefore be desirable to choose a glass, such as a borosilicate glass, which has a thermal expansion close to that of carbon fibres. Alternatively it may be desirable to choose a glass which has a very high strength and hardness at high temperatures, such as a nucleated glass. It will be appreciated that wide variations in glass compositions are therefore, possible, and certain details of these are given herein.

The proportion of carbon fibres to be used in the composite depends upon the required properties of the composite, but will in general be in the region 10–70% by volume. The carbon fibres may be in the form of relatively short lengths, e.g. 0.5–10 mm., or of long continuous lengths, i.e. extending to the full dimensions of the composite, and in the final composite these carbon fibres may be aligned or randomly oriented. One method of incorporation is to mix the fibres with a slurry or dispersion of a fine glass powder, dry the mix and then hot or cold press as above described. An alternative method is to impregnate a continuous tow of carbon fibres with powdered glass in the form of a slurry containing a proportion of an organic binder. The impregnated tow is then dried and the composite formed therefrom as above described.

DESCRIPTION OF THE PREFERRED EMBODIMENTS

In order that the present invention may more readily be understood, certain embodiments of the same will now be described by way of example.

It should first be explained that the methods of manufacture used are not within the scope of this invention, but are described herein for completeness.

For making composites containing short fibre lengths, we prefer to use the technique of U.K. patent applications 16,047/68, 29,296/68 and 50,888/68 (cognate), wherein a slurry is made up of carbon fibres, glass powder, organic binders and solvent and this slurry is cast, using a doctor blade technique, onto a carrier to form a sheet about 1 mm. thick which is dried by the removal of solvent. A typical mix is as follows:

Glass powder—90 cm.$^3$
3 mm. long carbon fibres—10 cm.$^3$
Polyvinyl acetate—20 gm.
Acrylic epoxy resin—10 gm.
Methyl ethyl ketone (solvent) to give a viscosity of 40 poises.

When dry, the sheet may be stripped from the carrier and fabricated. Bulk samples may be produced by hot pressing a number of sheets in a die. In order to obtain alignment of the fibres, a comb may be placed adjacent the doctor blade gap.

The above technique may also be used to produce sheets containing no carbon fibres and these sheets were used as hereinafter described.

For making composites containing continuous fibres, we prefer to use the technique of U.K. Patent Application 52023/68, wherein a continous length of carbon fibres is pulled over and under spreading rollers to form a tape and into a bath containing glass powder slurry whilst more slurry is sprayed onto the tape. Excess slurry is removed from the tape by rollers and it is then wound, while still wet, onto a flat sided drum so that the turns bond together. After drying at about 80° C. the material is removed from the drum. A typical mix is as follows:

| | Percent by volume |
|---|---|
| Glass powder | 5 |
| Polyvinyl acetate | 10 |
| Methyl ethyl ketone | 85 |

In a modification of the methods above described, a continuous tow of carbon fibres is passed through the slurry and under the doctor blade to produce a sheet containing aligned, continuous fibres.

As an alternative, the tow (after slight separation of the fibres) may be coated with glass powder using electrophoresis from a suspension in methyl alcohol under an electric field of 4 volts/cm. The bundle of fibres is then dried and treated as described herein.

These various processes enable fibre concentrations up to 70% to be achieved.

Normally, hot pressing was used in the fabrication of the composites, using stainless steel or graphite dies, sometimes with a molybdenum foil for surface finish. The dies were normally heated by resistive heating elements or by inductive coupling.

Turning now to the composites in accordance with the invention, the first examples relate to a borosilicate glass.

EXAMPLE 1

In this example a borosilicate glass was used and had the following composition, by weight:

| | Percent |
|---|---|
| Silica | 80.2 |
| Boron oxide | 12.3 |
| Alumina | 2.6 |
| Calcia | 0.1 |
| Sodium oxide | 4.5 |
| Potassium oxide | 0.3 |

The technique of manufacture was slightly different to those above described and, in this example, the glass powder (smaller than 53μ) was made into a slurry with isopropyl alcohol and carbon fibres amounting to 10% by volume of the glass were mixed in using a high speed mixer. The carbon fibres used had a UTS of 1.6 GNm.$^{-2}$ and a Youngs modulus of 360 GNm.$^{-2}$. They had a diameter of about 8μ and were chopped to 5 to 10 mm. lengths. After mixing, excess alcohol was removed by vacuum filtration to give a paste which was packed into a graphite die. The paste in the die was then vacuum dried and consolidated by vacuum hot-pressing at 800° C. and 7.0 MNm.$^{-2}$ for a few minutes.

The properties of the composite are compared with that of the glass in Table 1.

TABLE 1

| Material | Strength, MNm.$^{-2}$ | Work of fracture, Jm.$^{-2}$ | Resistivity, Ωm |
|---|---|---|---|
| Borosilicate glass | 88 | 3 | 6×10$^{19}$ |
| Glass plus 10% fibres | 62 | 200 | 300 |

It will be apparent that the material is changed from a good electrical insulator into a conductor and its work of fracture, which is a measure of its resistance to mechanical and thermal shock, is increased by nearly two orders of magnitude. It may be plunged into cold water from 550° C. without damage whilst ordinary borosilicate glass cannot stand such treatment.

EXAMPLE 2

In this example, the borosilicate glass used had a slightly different composition, as follows in percentage by weight:

| | Percent |
|---|---|
| Silica | 74.7 |
| Boron oxide | 13.4 |
| Alumina | 3.9 |
| Calcia | 0.8 |
| Sodium oxide | 5.9 |
| Potassium oxide | 0.8 |
| Magnesia | 0.5 |

In this example, a continuous tow was coated with the glass by electrophoresis as above described to incorporate 40% by volume of glass. After heat treatment as in Example 1 the material had the properties shown in Table 2.

TABLE 2

| Material | Strength, MNm.$^{-2}$ | Work of fracture, Jm.$^{-2}$ |
|---|---|---|
| Glass | 88 | 3 |
| Glass plus 40% fibres | 190-240 | 2×10$^3$ |
| Teak | 87 | 6×10$^3$ |

It will be seen that the material of this invention is twice as strong as ordinary glass and has a work of fracture more than a thousand times greater. It is in fact more like a tough fibrous material such as wood and yet has high temperature properties.

EXAMPLE 3

In this example standard Pyrex glass was used (believed to correspond approximately to the formula of Example 1) but a continuous tow was impregnated using the apparatus of our said application 52,023/68. The sample (46 cm. x 10 cm. x 1.0 cm. thick) was pressed in an open-ended stainless steel mould at 900° C. and 10.4 MN.m.$^{-2}$. Before being pressed, a thin layer of unreinforced glass/binder sheet was placed on each side of the compact to give a glazed surface to the product. The final composite contained about 40% by volume of carbon fibres. Tests showed that this material had the following properties:

Density—2.0 Tonne.m.$^{-3}$
Young's modulus—170 GN.m.$^{-2}$
Flexural strength 24° C.—700 MN.m.$^{-2}$
Flexural strength 400° C.—700 MN.m.$^{-2}$
Work of fracture—5 kJ.m.$^{-2}$ It will be appreciated that since the material of this invention has high temperature properties, it may be necessary to protect the carbon fibres from oxidation at elevated temperatures in oxidising atmospheres. This is most conveniently done by applying a protective coating to the composite and the above example describes one method wherein a layer of glass, containing no carbon fibres, is applied to the surfaces of the composite. The layer can be applied after the composite is formed. It will also be apparent that this layer need not have the same composition as the matrix and can indeed be of pure oxide ceramic or metal if desired.

In this particular example the carbon fibres in the various plies were aligned, but cross-lamination could of course be used.

EXAMPLE 4

A typical soda glass to which the invention may be applied is, by weight:

| | Percent |
|---|---|
| Silica | 70–74 |
| Alumina | 0.5–2.0 |
| Magnesia | 0–4 |
| Calcia | 5–10 |
| Sodium oxide | 12–17 |

EXAMPLE 5

The invention may also be applied to other glasses, for example a lead glass having the following composition by weight:

| | Percent |
|---|---|
| Silica | 56–58 |
| Alumina | 0–1 |
| Lead oxide | 30 |
| Potassium oxide | 12–13 |

EXAMPLE 6

The invention may also be applied to alumino-silicate glasses, for example a glass having the following composition by weight:

| | Percent |
|---|---|
| Lithium oxide | 4.1 |
| Alumina | 13.9 |
| Silica | 82.0 |

Nucleating glasses are frequently, but not necessarily, in the alumino-silicate system. It will be known that a nucleated glass is a glass which contains certain chemicals known as "nucleating agents" which cause the glass to crystallise or devitrify on suitable heat treatment. Nucleated glass has certain advantages as compared with either borosilicate glass or a conventional ceramic material such as porcelain and these advantages are well known in the art. As compared with borosilicate glass reinforced with carbon fibres a nucleated glass reinforced with carbon fibres would in general have superior strength, creep resistance and fatigue resistance at high temperatures and would also be in general harder and have a greater erosion and shock resistance. The fabrication methods are generally similar and the thermal treatment which results in the crystallisation of the glass may take place either before or after the addition of the carbon fibres.

EXAMPLE 7

The glass used in this example was an alumino-silicate glass similar to Corning 9608. A sample of this glass was heated to a temperature sufficient to melt it and ensure that all the constituents were in solution. The molten glass was then cooled normally to produce a transparent solid mass which was then broken up and milled to produce a fine powder. This powder was then mixed with the appropriate proportion of carbon fibres by one of the routes described above and the resultant mixture was hot pressed at a sufficiently high temperature to cause the glass to become plastic and flow to form a proper matrix around the carbon fibres. This glass composite was then heat treated in accordance with the known techniques to cause the glass to devitrify or crystallise and produce the final composite.

EXAMPLE 8

In this example the same glass was used but it was heat treated as an initial step in order to cause it to crystallise and the resultant opaque material was then ground up to produce a powder. It should be emphasised that the crystallite size in a nucleated glass is extremely fine, typically less than 1 micron, but that the grinding procedure adopted was only sufficient to obtain particles in the size range less than 53 microns. This powder was then mixed to a paste with isopropyl alcohol and 20% by volume of carbon fibres, the carbon fibres having a diameter of 8 microns and a length of approximately 2 mm. The resultant paste mixture was then vacuum hot pressed at a temperature of 1250° C. and a pressure of 10.4 MN.m.$^{-2}$, the pressure actually being applied only whilst the material was at a temperature in excess of 800° C. The final product was a composite very similar to that produced in accordance with Example 7, but no material increase had taken place in the crystallite size even though the grinding step produced a relatively coarse powder. Thus the final product had the properties of a nucleated glass, insofar as the matrix was concerned, rather than the properties of a technical ceramic such as porcelain.

EXAMPLE 9

The procedure of Example 3 was repeated using the glass of Example 8 with a 35% by volume loading of carbon fibres, a pressing temperature of 1300° C. and a pressure of 17.2 MN.m.$^{-2}$. The properties of the composite were as follows:

Density—2.1 Tonnes. m.$^{-3}$
Young's modulus—138 GN.m.$^{-2}$
Flexural strength 24° C.—820 MN.m.$^{-2}$
Flexural strength 400° C.—810 MN.m.$^{-2}$
Flexural strength 600° C.—790 MN.m.$^{-2}$
Work of fracture—7.5 kJ.m.$^{-2}$

EXAMPLE 10

The nucleating glass, Corning 9608, is catalysed with titania. It is possible to use other nucleating catalysts, for example zirconia, and two such glass compositions, by weight, are:

| | Parts | |
|---|---|---|
| Silica | 65 | 75 |
| Alumina | 30 | 20 |
| Lithium oxide | 5 | 5 |
| Potassium oxide | 1 | 1 |
| Phosphorus pentoxide | 3 | 1 |
| Zirconia | 4 | 4 |

EXAMPLE 11

It is not necessary to use nucleating glasses in the alumino-silicate system and other known nucleating glasses are possible. For example the following two compositions, by weight, may be used:

| | Percent | |
|---|---|---|
| Silica | 73.1 | 67.9 |
| Magnesia | 7.0 | 15.5 |
| Lithium oxide | 10.5 | 13.6 |
| Boron trioxide | 6.4 | |
| Phosphorus trioxide | 3.0 | 3.0 |

Alternatively a composition within the following weight range may be used:

| | Percent |
|---|---|
| Silica | 37.2–58.1 |
| Zinc oxide | 15.8–50.5 |
| Lithium oxide | 4.5–23.1 |
| Phosphorus pentoxide | 3.0 |

EXAMPLE 12

If it is desired to make the composite by infiltration of a mass of carbon fibres by molten glass or by mixing short carbon fibres with molten glass, then it is preferable to use a glass with a relatively low melting point, such as the glass of Example 5.

In order to demonstrate the remarkable properties of the material of the present invention, the properties of the specific composites of Examples 3 and 9 are compared, in Table 3, with other materials.

TABLE 3

| | Density, tonnes.m$^{-3}$ | Young's modulus, GNm.$^{-2}$ | Specific Young's modulus, kNm.kg.$^{-1}$ | Flexural or tensile strength at 24°C., MNm.$^{-2}$ | Strength at 400°C., MNm.$^{-2}$ | Strength at 600°C., MNm.$^{-2}$ | Specific strength at 24°C., kNm.kg.$^{-1}$ | Specific strength at 400°C., kNm.kg.$^{-1}$ | Specific strength at 600°C., kNm.kg.$^{-1}$ | Work of fracture, Jm.$^{-2}$ | Specific work of fracture, Jm.kg.$^{-1}$ | Maximum service temperature, °C. |
|---|---|---|---|---|---|---|---|---|---|---|---|---|
| Example 3 | 2.0 | 170 | 85 | 700 | 700 | | 350 | 350 | | 5×10$^3$ | 2.5 | 450 |
| Example 9 | 2.1 | 138 | 66 | 820 | 810 | 790 | 390 | 385 | 375 | 7.5×10$^3$ | 3.6 | 1,000 |
| Pyrex | 2.2 | 59 | 27 | 97 | 97 | | 44 | 44 | | 4 | 0.002 | 450 |
| Corning 9608 | 2.5 | 83 | 33 | 140 | 140 | 140 | 56 | 56 | 56 | 10 | 0.004 | 1,000 |
| Teak | 0.6 | 12 | 20 | 90 | | | 150 | | | 8×10$^3$ | 13.3 | 200 |
| Polythene | 0.9 | 0.14 | 0.16 | 14 | | | 16 | | | 4×10$^3$ | 4.4 | 100 |
| Methacrylate resin | 1.2 | 2.8 | 2.4 | 97 | | | 81 | | | 4×10$^3$ | 0.3 | 80 |
| Glass fibre reinforced epoxy resin | 1.6 | | 17.5 | 600 | | | 375 | | | Not known | | 200 |
| Carbon fibre reinforced epoxy resin | 1.28 | 128 | 100 | 600 | | | 470 | | | Not known | | 180 |
| Aluminium alloy | 2.8 | 69 | 25 | 280 | | | 100 | | | 10$^4$ | 3.6 | 200 |
| Titanium alloy | 4.5 | 120 | 27 | ~750 | ~450 | | ~167 | ~100 | | 10$^4$ | 2.2 | 380 |
| Alloy steel | 7.8 | 190 | 24 | ~730 | ~650 | ~360 | ~94 | ~70 | ~47 | 5×10$^4$ | 6.4 | 800 |

Table 3 makes it clear that the material of the present invention has properties unlike those of any other material. For example the work of fracture is like that of teak or a ductile metal, the tensile strength is comparable with titanium, the density is low and the service temperature is high. However, this table cannot show all the properties and, for example, the material may be made isotropic or anisotropic, its mode of fracture is fibrous, it is very stiff for its weight, it has high thermal and mechanical shock resistance, and it is very hard. It has good corrosion and fire resistance. It is most similar to another relatively new material, viz. carbon fibre reinforced plastics, but can be mechanically stable to 1000° C. and is much harder. Consequently, like that material, it can be used for gas turbine blades for aircraft but is not limited to being used as cold compressor blades and it is only about half as dense as the titanium alloy it replaces. On the other hand, the Example 3 material (which uses relatively cheap borosilicate glass) has many of the properties of the expensive unreinforced nucleated glass but is also tough; the Example 9 material is even better.

We claim:

1. A composite material comprising a glass matrix reinforced with a plurality of carbon fibres embedded in the matrix, said carbon fibres being preformed by the controlled thermal degradation and oxidation of organic fibres prior to the inclusion of the fibres in the composite material.

2. A composite material according to claim 1 wherein the said fibres comprise thermally degraded polyacrylonitrile.

3. A composite material according to claim 1 including from 10 to 70% by volume of carbon fibres.

4. A composite material according to claim 1 wherein the carbon fibres have lengths within the range of 0.5 to 10 mm.

5. A composite material according to claim 1 wherein the carbon fibres are aligned with respect to one another.

6. A composite material according to claim 1 wherein the matrix is an alumino-silicate glass.

7. A composite material according to claim 1 wherein the matrix is a boro-silicate glass.

8. A composite material according to claim 1 including at least one surface layer in which there are no carbon fibres.

References Cited

UNITED STATES PATENTS

| | | | |
|---|---|---|---|
| 3,113,877 | 12/1963 | Jahakirama-Roa | 65—33 X |
| 3,116,137 | 12/1963 | Vasilos et al. | 65—33 X |
| 3,170,805 | 2/1963 | McMillan et al. | 65—33 X |
| 3,282,711 | 11/1966 | Lin | 65—33 X |
| 3,220,915 | 11/1965 | Shannoix | 05—33 X |
| 3,252,814 | 5/1966 | Russell et al. | 65—33 X |
| 3,269,818 | 8/1966 | Tiede | 65—33 X |
| 3,378,431 | 4/1968 | Smith, Jr. et al. | 106—52 X |
| 3,390,452 | 7/1968 | Huang | 65—22 X |
| 2,123,536 | 7/1938 | Long | 65—22 |

FRANK W. MIGA, Primary Examiner

U.S. Cl. X.R.

65—33, 4, 23, 22, 9, 374; 106—52, 50